United States Patent
Hunter

[15] 3,658,037
[45] Apr. 25, 1972

[54] GROUND-STAKE ANIMAL TETHER

[72] Inventor: Brian C. Hunter, Crivitz, Wis. 54114

[22] Filed: Sept. 28, 1970

[21] Appl. No.: 75,973

[52] U.S. Cl. .............................. 119/121, 273/200, 119/117
[51] Int. Cl. ........................................................ A01k 3/00
[58] Field of Search .................. 119/117, 121, 125; 273/35, 273/200

[56] References Cited

UNITED STATES PATENTS

| | | | |
|---|---|---|---|
| 1,579,294 | 4/1926 | Fisk | 273/200 R |
| 2,305,187 | 12/1942 | Neiden | 273/200 R |
| 2,790,419 | 4/1957 | Sullivan | 119/121 |
| 2,981,230 | 4/1961 | Putnam | 119/117 |

FOREIGN PATENTS OR APPLICATIONS

229,114   2/1925   Great Britain ......................... 273/34

Primary Examiner—Aldrich F. Medbery
Attorney—Arthur J. Hansmann

[57] ABSTRACT

A sleeve having a cylindrical opening for snugly rotatably receiving a cylindrically shaped rod with a connector affixed to one end of the rod. The sleeve and rod are telescoped together and the connector extends from the rod and radially outwardly to the plane of the wall of the sleeve for abutting the sleeve and being rotatable over the abutted edge of the sleeve. An animal leash is attachable to the connector for restraining an animal connected to the leash. The sleeve is imbedded to at least the ground elevation, and the rod can be dropped into the sleeve or removed from the sleeve and placed into another sleeve at a different location.

9 Claims, 4 Drawing Figures

PATENTED APR 25 1972　　　　　　　　　　　　　　　　3,658,037
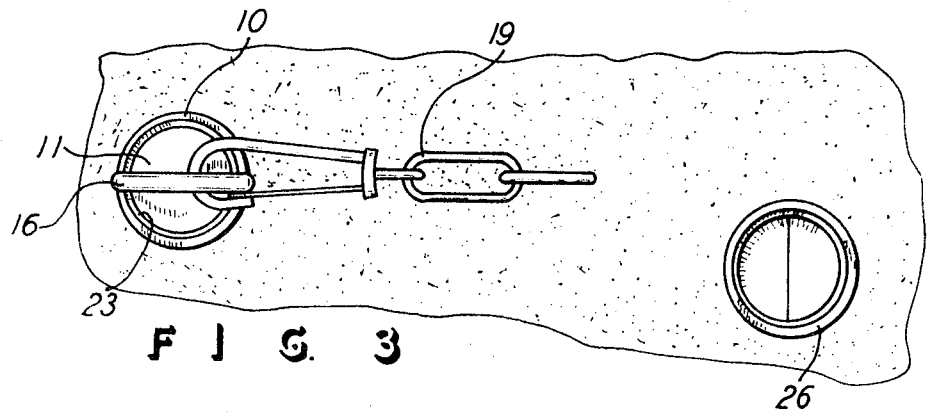
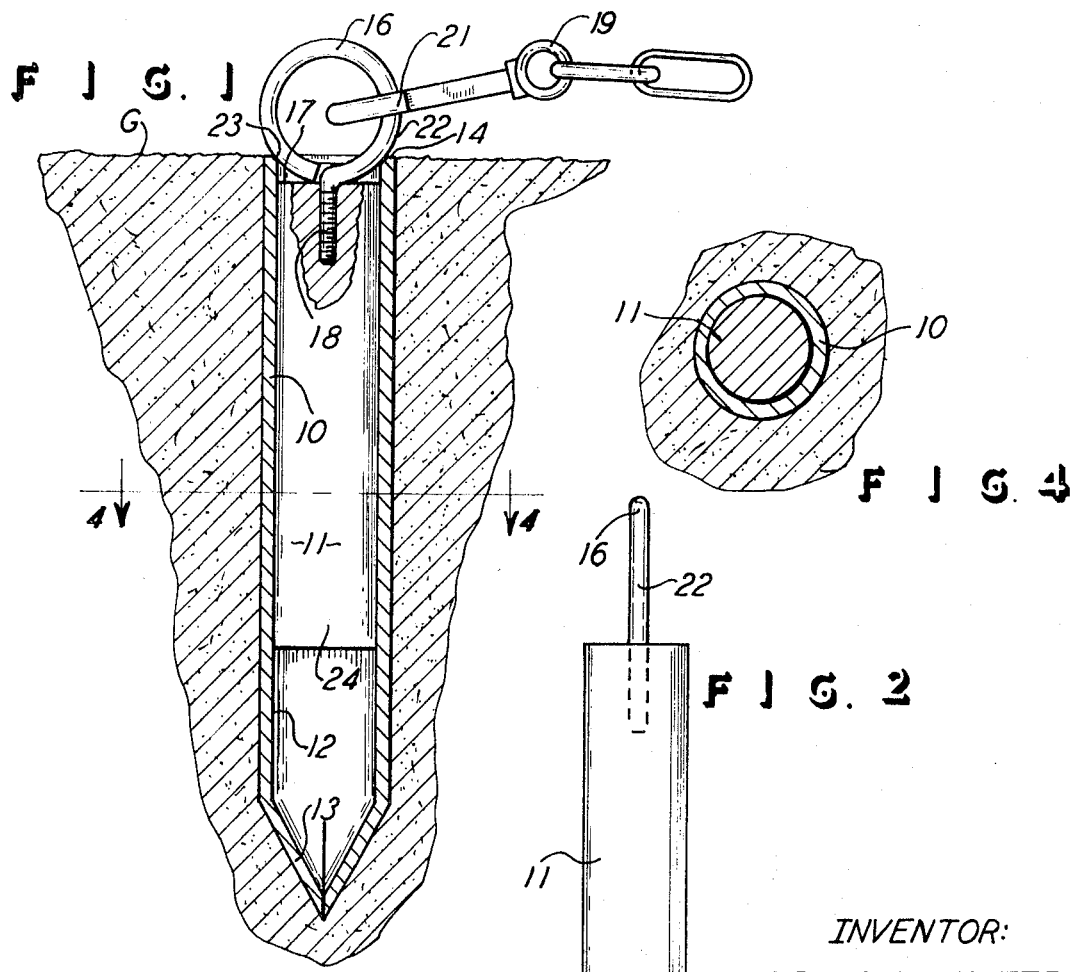
INVENTOR:
BRIAN C. HUNTER
ATTORNEY

GROUND-STAKE ANIMAL TETHER

This invention relates to a ground-stake tether device of the type which is most usable in restraining a dog or such animal in the yard.

BACKGROUND OF THE INVENTION

Tether stakes are very commonly known in the art, and such stakes exist in many different forms. These stakes are commonly arranged with several parts, one of which is imbedded in the ground by being driven into the ground, and the other parts may be telescoped, rotatable, and otherwise movable and associated with the ground imbedded part. The part of the stake extending above the ground then commonly has a leash attached to it. The purpose of these ground stakes is to secure a leash and thereby restrain the animal, and the multiple-part stakes are arranged so that the leash will not become entangled with the stake but instead it will be able to be pulled in circular patterns around the stake and yet not become tangled or restricted by the stake.

These prior art ground stakes are generally of a complicated and expensive structure, and these stakes are also inadequate in the function of being sturdy and secure in position and in the function of being in the way when the lawn is to be mowed, or when the stake is not in use for its intended purpose. Still further, the prior art stakes are arranged so that they must either be unduly large or specially imbedded in order to make them adequately secure in their restraining function.

Accordingly, it is the general purpose of the present invention to provide a ground-stake tether device which overcomes the aforementioned problems and which results in advantages and in conveniences, in contrast to the aforementioned prior art.

More specifically, it is an object of this invention to provide a ground-stake tether device which is of a minimum size, minimum expense, minimum number of parts, minimum manufacturing requirements, minimum installation and maintenance requirements, but which provides a sturdy and completely secure restraint for the tethered animal.

In accomplishing the aforementioned objects, the device of this invention is of a minimum length to provide the maximum anchoring sturdiness and the device is imbedded into the ground at the ground elevation with respect to the sleeve portion of the device, and the telescoping rod portion of the device is readily removable from the sleeve portion so that the device will not be in the way when it is not in use. In this instance, the lawn may be mowed, the device will not be hazardous for tripping people and the device will not be available for theft and any unsightliness when it is not in use.

Still further, it is an object of this invention to provide the device mentioned and to do so in a system where the device can be arranged so that the anchor point of the tethering can be readily and easily located at more than one location in the yard. In this manner, the animal can be placed in any desired location in the yard, and the selection and placement can be readily and easily obtained simply by picking up the telescoped rod portion and dropping it into a second or third sleeve portion already located and imbedded in another location in the ground.

Still further, it is an object of this invention to provide a ground-stake tether device which provides maximum reliability in assuring that the leash or like chain will not become entangled in the anchor portion of the device, even though the leash is dragged around the device in a circular fashion which would normally entangle the leash with the stake or anchor portion of the device.

BRIEF DESCRIPTION OF THE DRAWINGS

FIG. 1 is a longitudinal sectional view of the device shown imbedded in the ground.

FIG. 2 is a side elevational view of the center or rod portion of the device shown in FIG. 1.

FIG. 3 is a top plan view of the device shown in FIG. 1, and with another sleeve portion shown therewith on a portion of the ground.

FIG. 4 is a sectional view taken on the line 4—4 of FIG. 1.

DETAILED DESCRIPTION OF THE PREFERRED EMBODIMENT

The drawings show the device to include the sleeve portion 10 and the central or rod portion 11 which snugly telescopes within the sleeve portion 10. For this purpose, the sleeve 10 presents a cylindrical opening 12 extending the length of the sleeve 10 except for the lower wedge point 13 on the sleeve 10. The wedge point 13 provides a means for driving the sleeve 10 into the ground to preferably at least the elevation of the ground designated G. That is, the sleeve upper edge 14 is shown at the ground level G, and therefore, when the rod 11 is removed from the sleeve 10, the ground can be mowed, and there is no obstacle remaining on the ground.

Thus the rod 11 is shown to be cylindrically shaped and is snugly rotatably disposed in the sleeve circular opening 12. Further, the rod 11 is shown to be of a length at least inches less than the length of the sleeve 10. Therefore, any dirt or debris which may enter the sleeve 10 will simply fall to the bottom of the sleeve near the lower wedge point 13 and will not interfere with the insertion and removal of the rod 11.

A connector, shown to be a hook 16, is affixed to the rod upper end 17 by means of threads 18 on the hook 16, and the hook threaded end 18 is axially disposed on the rod upper end 17. Finally, a leash 19, having a conventional releaseable hook 21, is secured with the hook 16 so that an animal can be restrained by the leash 19 at the unshown far end of the leash 19.

It will also be noted that the hook 16 has a smooth and circular exterior surface designated 22, and this surface abuts the smooth and circular surface 23 of the sleeve upper edge 14. That is, the surface 23 is shown to be a beveled surface, and the surfaces 22 and 23 are in abutment to limit the penetration of the rod 11 into the sleeve 10 but to permit easy rotation of the rod 11 relative to the sleeve 10. That is, the leash 19 can be dragged in a circular path around the hook 16 but yet the leash 19 will not become tangled with the stake device described, and particularly the leash 19 will not become tangled with the hook 16. Therefore, it will be seen and understood that the hook 16 is of a size and extent that it projects into the plane of the wall of the sleeve 10 and thus abuts the sleeve edge 23, as described, and thereby relates the sleeve 10 and rod 11 and also permits the rotation described. Further, it should be appreciated that the leash hook 21 could be pulled directly over the hook 16, since the hook 16 is of a low silhouette and is circular, and again the hook 21 and its leash 19 would not become tangled with the hook 16 or any part of the stake described.

By virtue of the telescoping relationship of the sleeve 10 and rod 11, the stake is of optimum strength and resistance in being pulled out, in that the force pulling on the leash 19 is transmitted through the rod 11 and to the bottom end 24 where the end 24 would tend to move laterally against the adjacent wall of the sleeve 10. At this low or deep point in the ground, the sleeve 10 itself is most sturdy, so the entire stake is sturdy. Also, it will be readily appreciated that one need only pick up the rod 11 by the hook 16, and the leash 19 can then be used in a different manner or it can be readily placed in a different location. Therefore, FIG. 3 shows a second sleeve, which is designated 26, and this sleeve is in a second location in the ground. The sleeve 26 is not shown with the rod 11, since only one rod 11 would be required, and that rod is already shown on the left-hand portion of FIG. 3. As mentioned, the rod 11 could be removed from the sleeve on the left-hand portion and positioned in the sleeve 26 on the right-hand portion of FIG. 3. This would permit relocating the anchoring of the leash 19, as is desirable.

Thus, since the rod 11 is snugly telescoped within the sleeve 10, and, since the sleeve 10 is most likely to be imbedded into the ground by being driven therein, the sleeve wedge point 13 is provided and closes off the lower end of the sleeve so that the ground will not enter the sleeve and interfere with the location of the rod 11 inside the sleeve 10. Also, while FIG. 1 shows that the hook 16 is in overlying and therefore abutting contact with the sleeve bevel surface 23 at diametrically opposite sides of the bevel surface 23, it should be understood that the hook 16 could contact the bevel surface 23 at only one location, and still fully retain the function of having the rod 11 rotatable within the sleeve 10, for the purpose mentioned. Also, while only a minimum number of parts are required, and such parts are of no complexity, it should still be recognized that a completely sturdy and completely reliable tether device is provided, and one which will avoid the tangling of the leash and one which can be easily dispensed with when it is not to be used in its restraining function and only sleeve 10 will remain in the ground but will not at all be in the way.

It is important that the device be stable in the ground. Thus, the sleeve 10 should be secure, even though there are jerking forces applied to the rod 11 through the tie-on or leash 19. Horizontal forces on the chain 19 will not affect the fixed position of the sleeve 10 which fully resists the horizontal forces. Further, a pull on the chain 19 with a slightly upward component can lift the rod 11 up in the sleeve 10. However, it is important to note that any upward force on the rod 11 will not be transmitted to the sleeve 10 which, therefore, remains firmly imbedded.

Still further, when the upward force is relieved in the rod 11, the rod 11 quickly falls in the sleeve 10 to securely reseat itself to the position shown. The rod 11 is a solid bar and is of a weight greater than the weight of the sleeve 10 so the rod 11 freely and quickly falls in the sleeve 10. That is, the rod 11 is a weight member for full axial movement in the sleeve 10 and for rapid free fall therein. In one acceptable device, the sleeve 10 and rod 11 are of a cold rolled steel, and the sleeve weighs one pound and the rod weighs one and one-half pounds. In the free-fall position shown, which is the normal operating position of the device, the hook 16 is at the ground level, as shown.

What is claimed is:

1. A ground-stake animal tether device, comprising a ground engaging sleeve having a cylindrical interior axially uprightly disposed when said sleeve is imbedded into the ground with the upper edge of said sleeve being at ground elevation, a cylindrical rod snugly and rotatably disposed in said cylindrical interior of said sleeve and being of a length at least one - half that of the sleeve but less than the length of said sleeve, and a leash connector affixed to one end of said rod and being of a size sufficient to extend from said rod to a location in the plane of the wall of said sleeve and into abutment with the upper edge of said sleeve to thereby have said connector project beyond said sleeve, said sleeve upper edge and said connector having mutually abuttable smooth surfaces for rotation of said rod and said connector relative to said sleeve.

2. The device as claimed in claim 1, wherein the end of said sleeve opposite said upper edge is closed for penetration of the ground free of having dirt enter said sleeve when said sleeve is driven into the ground, and said rod being of a length at least inches less then the length of said sleeve to have the end of said rod opposite said one end spaced away from the closed end of said sleeve for collection of dirt in said sleeve at the length thereof beyond said rod.

3. The device as claimed in claim 1, including two of said sleeves imbedded at different locations in the ground and at the elevation of the ground, as claimed in claim 1, for selective positioning of said rod in either of said two sleeves to tether at either of the two locations.

4. The device as claimed in claim 1, wherein said upper edge of said sleeve is beveled inwardly toward the central axis of said sleeve, and said connector is a hook having an eyelet with a curvature presenting its surface parallel to the bevel on said sleeve in providing said abuttable surfaces.

5. The device as claimed in claim 1, wherein said connector has an eyelet threaded into said one end of said rod to be affixed thereto, and said connector has a curvature extending from said rod to the location of abutment with said upper edge of said sleeve.

6. The device as claimed in claim 1, wherein said connector is a hook having a circular eyelet extending from said rod in a continuous circle of a diameter large enough to present said abuttable surface to said sleeve upper edge, said diameter of said circular eyelet being only slightly greater than the diameter of said cylindrical interior and being partly disposed within said cylindrical interior, the remainder of said circular eyelet extending out of said cylindrical interior in a low profile for sliding of a leash over the extending circumference of the top of said remainder when the leash is pulled diametrically across said eyelet.

7. The device as claimed in claim 1, wherein said sleeve in its upper portion in the axially vertical position in the ground is of one uniform inner diameter at said cylindrical interior, said rod being a solid cylindrical bar and being freely slidable in said cylindrical interior for free fall therein to the full length of said rod and downwardly to the limit of abutment of said abuttable surfaces.

8. The device as claimed in claim 1, wherein said rod is freely axially movable in said sleeve for axial withdrawal of said rod from said sleeve free of axial force on said sleeve.

9. The device as claimed in claim 8, wherein said rod is a solid bar of a weight greater than the weight of said sleeve for rapid and free fall of said rod in said sleeve.

* * * * *